UNITED STATES PATENT OFFICE.

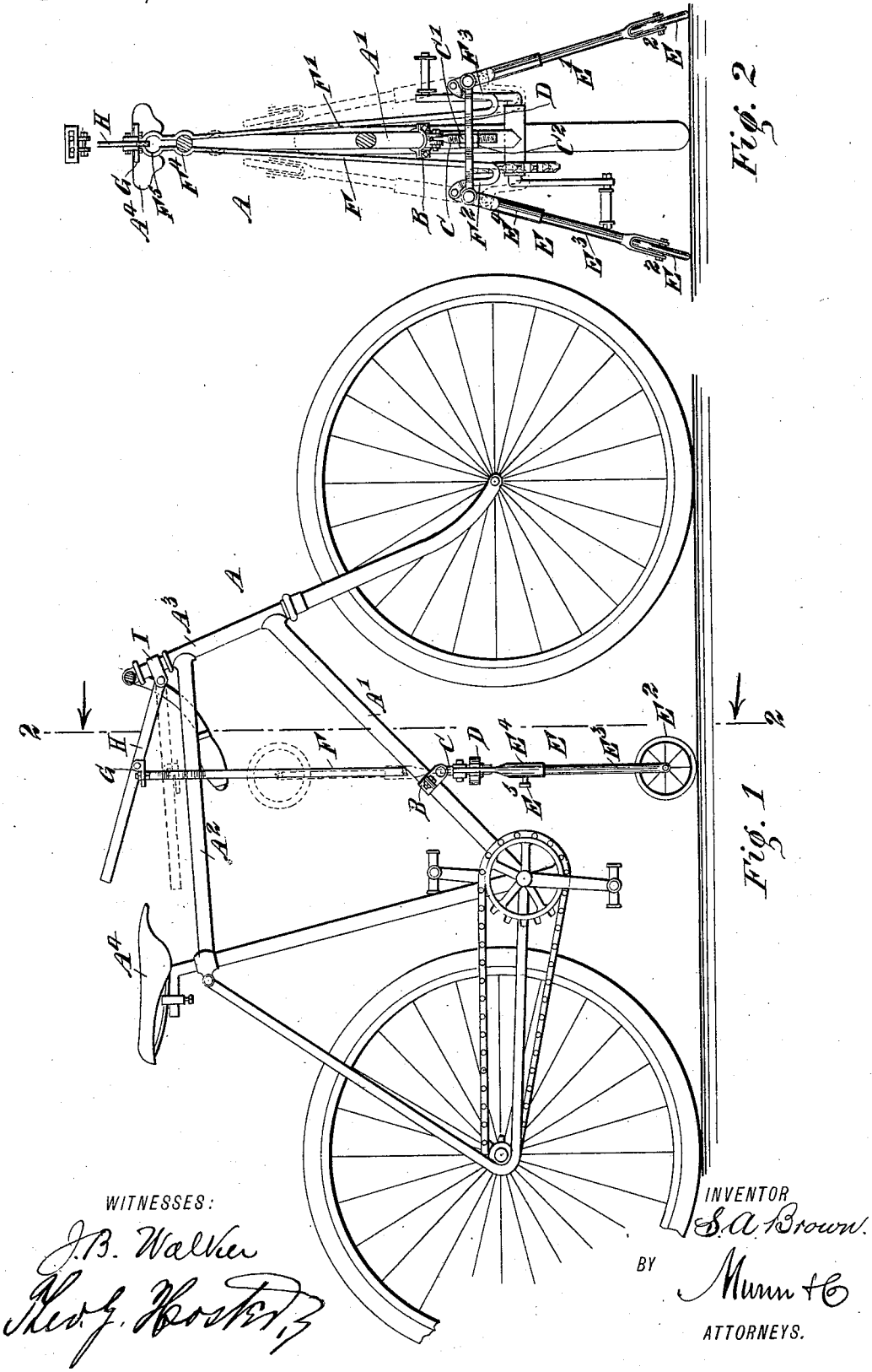

STUART A. BROWN, OF HUBBARDSTON, MASSACHUSETTS, ASSIGNOR OF ONE-HALF TO E. HARLAN BENNETT, OF SAME PLACE.

BICYCLE-SUPPORT.

SPECIFICATION forming part of Letters Patent No. 562,278, dated June 16, 1896.

Application filed September 27, 1895. Serial No. 563,866. (No model.)

*To all whom it may concern:*

Be it known that I, STUART A. BROWN, of Hubbardston, in the county of Worcester and State of Massachusetts, have invented a new and Improved Adjustable Bicycle-Support, of which the following is a full, clear, and exact description.

The object of the invention is to provide a new and improved bicycle-support which is simple and durable in construction, and arranged to enable the rider to quickly bring the support in action, to hold the wheel in an upright position on the road or other place.

The invention consists principally of a pair of legs mounted to swing transversely on the sides of the bicycle-frame, said legs being normally folded up against the sides of the frame, and adapted to swing downward to engage their free ends with the ground on opposite sides of the frame.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in both the figures.

Figure 1 is a side elevation of the improvement as applied, part of the handle-bar being in section; and Fig. 2 is a transverse section of the same on the line 2 2 of Fig. 1.

On the lower bar $A'$ of the frame of the bicycle A is secured a clip B, on which is fulcrumed a downwardly-extending screw-rod C engaging a transverse plate D held in place on the said screw-rod by two nuts $C'$ and $C^2$, screwing on the screw-rod and engaging the top and bottom of the plate D. On the outer ends of the said plate D are fulcrumed legs E and $E'$, extending on opposite sides of the bicycle-frame, and carrying at their lower ends wheels $E^2$, adapted to move in contact with the ground, as is plainly illustrated in the drawings. Each of the legs E and $E'$ is made of two sections $E^3$ and $E^4$, telescoping one in the other, and adapted to be fastened together by a set-screw $E^5$. By this arrangement, the legs may be lengthened or shortened according to the size of the bicycle, so that when the legs are swung downward in engagement with the ground, as shown in the drawings, then the said legs stand obliquely to the frame, to securely hold the bicycle in position.

The pivot ends of the legs E and $E'$ are somewhat extended and are pivotally connected with the curved ends $F^2$ and $F^3$, respectively, formed on the arms F and $F'$, respectively, extending upwardly, to connect at their free ends with a plate G fulcrumed on a lever H extending over the upper bar $A^2$ of the bicycle-frame, to be within reach of the rider, seated on the saddle $A^4$. The forward end of the lever H is fulcrumed on a clip I held on the steering-head $A^3$ of the bicycle-frame.

The upper ends of the arms F and $F'$ are formed with notches $F^4$ $F^5$, adapted to engage the upper bar $A^2$, so as to hold the said arms in place when in an uppermost or lowermost position and lock the legs E and $E'$ in an uppermost inactive or lowermost active position. When the lever H is in a lowermost position, as shown in dotted lines in Fig. 1, then the legs E and $E'$ are folded up against the sides of the bicycle-frame, as indicated in dotted lines in Figs. 1 and 2, so that the bicycle can be used in the usual manner.

When it is desired to support the bicycle in an upright position on the road or any other place, and the operator pulls the lever H up into the position shown in full lines in Fig. 2, then the said lever exerts a downward pull on the arms F and $F'$, to cause the legs E and $E'$ to swing downwardly into the position shown in Figs. 1 and 2, so that the wheels $E^2$ of the said legs engage the ground a suitable distance from the base of the wheel and on opposite sides thereof, to securely hold the wheel in position.

It is understood that when the legs E and $E'$ are in a lowermost position, the bicycle has four contact-points with the ground, two from the front and rear wheels of the bicycle and two on opposite sides upon the wheels $E^2$. The bicycle-support is arranged in such a manner that the front wheel can be readily turned right or left, according to the direction in which the rider desired to travel, and then the pedals can be worked in the usual manner without interference with the attachment.

Having thus fully described my invention, I claim as new and desire to secure by Letters Patent—

1. In a bicycle-support, the combination of a clip adapted to be secured to the frame, a screw-rod carried on said clip and depending below the frame, a plate held adjustably on the lower end of said screw-rod, said plate having its opposite ends projecting beyond the opposite sides of the frame, legs pivoted to the opposite ends of said plate and adapted to swing in vertical planes, arms pivotally connected with the upper ends of said legs and arranged to extend up above the bicycle-frame, a lever fulcrumed on the frame and connected with the upper ends of said arms, and means for holding said arms in their upper and lower positions, substantially as set forth.

2. In a bicycle-support, the combination of a plate adjustably secured at its central portion to the frame and having its ends arranged to extend beyond opposite sides of the frame, legs pivoted on the ends of the plate and arranged to swing in vertical planes, arms connected together at their upper ends and secured at their lower ends to the upper ends of the legs, and a lever fulcrumed on the frame and connected to the upper ends of the arms, said arms being elastically pressed toward each other and having notches at their upper ends arranged to engage the upper part of the frame to hold the arms in their upper and lower positions, substantially as set forth.

STUART A. BROWN.

Witnesses:
E. HARLAN BENNETT,
SAM A. SEARS.